United States Patent [19]

(12) United States Patent
Lee

(10) Patent No.: US 9,596,432 B2
(45) Date of Patent: Mar. 14, 2017

(54) DISPLAY APPARATUS AND CONTROL METHOD THEREOF

(71) Applicant: Samsung Electronics Co., Ltd., Suwon-si (KR)

(72) Inventor: Yong-hoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 14/272,997

(22) Filed: May 8, 2014

(65) Prior Publication Data

US 2014/0354760 A1 Dec. 4, 2014

(30) Foreign Application Priority Data

May 31, 2013 (KR) .................. 10-2013-0062893
Jan. 7, 2014 (KR) .................. 10-2014-0001812

(51) Int. Cl.
*G06K 9/00* (2006.01)
*H04N 7/15* (2006.01)
(Continued)

(52) U.S. Cl.
CPC .............. *H04N 7/15* (2013.01); *H04N 7/147* (2013.01); *H04N 21/4223* (2013.01); *H04N 21/44218* (2013.01); *H04N 21/4788* (2013.01)

(58) Field of Classification Search
CPC ......... H04N 21/4223; H04N 21/44218; H04N 7/147; H04N 7/15; H04N 21/4788
See application file for complete search history.

(56) References Cited

U.S. PATENT DOCUMENTS 5,760,752 A * 6/1998 Kanba .................. H04N 7/141
345/2.2
8,139,818 B2 3/2012 Takahata et al.
(Continued)

FOREIGN PATENT DOCUMENTS

EP 2355501 A1 8/2011
JP 11-355804 A 12/1999
(Continued)

OTHER PUBLICATIONS

Communication dated Sep. 25, 2014 issued by Korean Intellectual Property Office in counterpart International Application No. PCT/KR2014/004062.

(Continued)

*Primary Examiner* — Shefali Goradia
(74) *Attorney, Agent, or Firm* — Sughrue Mion, PLLC

(57) ABSTRACT

A display apparatus including: a camera configured to photograph a first user of the display apparatus; a communication interface configured to communicate with an external apparatus of a second user; a display configured to display an image of a visual communication between the first user and the second user; and a controller configured to generate information regarding a change in a position of a face of the first user from an image of the first user photographed by the camera during the visual communication, and configured to transmit the information regarding the change in the position of the face of the first user to the external device so that the face of the first user having the changed position is displayed on the external apparatus.

32 Claims, 13 Drawing Sheets

(51) Int. Cl.
*H04N 7/14* (2006.01)
*H04N 21/4223* (2011.01)
*H04N 21/442* (2011.01)
*H04N 21/4788* (2011.01)

(56) References Cited

U.S. PATENT DOCUMENTS

| | | | |
|---|---|---|---|
| 8,311,293 B2* | 11/2012 | Okada | G06K 9/00308 |
| | | | 382/118 |
| 8,320,624 B2 | 11/2012 | Takahata et al. | |
| 9,094,576 B1* | 7/2015 | Karakotsios | H04N 7/157 |
| 2008/0037836 A1* | 2/2008 | Chen | G06K 9/00281 |
| | | | 382/118 |
| 2008/0123734 A1* | 5/2008 | Lin | H04N 1/00137 |
| | | | 375/240.01 |
| 2009/0295832 A1* | 12/2009 | Takatsuka | G06T 3/40 |
| | | | 345/659 |
| 2009/0309897 A1 | 12/2009 | Morita et al. | |
| 2009/0315974 A1* | 12/2009 | Matthews | H04N 7/144 |
| | | | 348/14.08 |
| 2010/0156907 A1* | 6/2010 | VanderSpek | G06T 7/0028 |
| | | | 345/427 |
| 2011/0081952 A1 | 4/2011 | Song et al. | |
| 2011/0085046 A1 | 4/2011 | Seo | |
| 2011/0141219 A1* | 6/2011 | Yeh | G06T 7/20 |
| | | | 348/14.02 |
| 2011/0249076 A1 | 10/2011 | Zhou et al. | |
| 2011/0304541 A1* | 12/2011 | Dalal | G06F 3/017 |
| | | | 345/158 |
| 2013/0137483 A1* | 5/2013 | Senoo | G09G 5/00 |
| | | | 455/556.1 |
| 2015/0229888 A1* | 8/2015 | Harada | G06K 9/00664 |
| | | | 348/207.1 |

FOREIGN PATENT DOCUMENTS

| | | |
|---|---|---|
| JP | 2008-67078 A | 3/2008 |
| JP | 2009-059042 A | 3/2009 |
| JP | 2009-246408 A | 10/2009 |
| JP | 2010-171690 A | 8/2010 |
| KR | 10-2009-0017355 A | 2/2009 |
| KR | 10-2011-0131404 A | 12/2011 |
| KR | 10-2012-0050346 A | 5/2012 |
| KR | 10-2012-0054411 A | 5/2012 |

OTHER PUBLICATIONS

Communication dated Oct. 26, 2016, issued by the European Patent Office in counterpart European Patent Application No. 14803587.6.

* cited by examiner

DISPLAY APPARATUS AND CONTROL METHOD THEREOF

CROSS-REFERENCE TO RELATED APPLICATION

This application claims priority from Korean Patent Application No. 10-2013-0062893, filed on May 31, 2013 and Korean Patent Application No. 10-2014-0001812, filed on Jan. 7, 2014, in the Korean Intellectual Property Office, the disclosures of which are incorporated herein by reference in their entirety.

BACKGROUND

Field

Apparatuses and methods consistent with the exemplary embodiments relate to a display apparatus and a control method thereof in which data can be transmitted to and received from an external device through a network connection, and more particularly to a display apparatus and a control method thereof in which a transmission bandwidth of video data can be reduced in terms of transmitting the video data obtained from taking images of a user of the display apparatus to an external device for visual communication between both parties.

Description of the Related Art

An image processing apparatus processes video data for final display as an image. Such an image processing apparatus includes a display panel which processes a video signal which is displayed as an image by itself, or processes a video signal without the panel to be output to another apparatus. The former is, for example, a display apparatus that includes a television (TV) and is easily accessible by a user.

The display apparatus, such as a TV or the like, can include various and complicated functions beyond a function of simply providing a broadcast, in accordance with technical developments, the increase in the amount of content available, user demands, etc., in addition to a basic function of processing a broadcasting signal received from a transmitter of a broadcasting station and displaying a broadcasting image. For example, the display apparatus may perform communication so as to be able to transmit and receive data to and from one or more different display apparatuses through a network. Therefore, such a display apparatus provides an environment for communication between users of the respective display apparatuses. In such an environment, there is chatting or visual communication.

Chatting is a method of relaying the intentions of the users of the display apparatuses, which are communicating with each other, into texts. Chatting allows the display apparatuses to exchange text data with each other and to display the text data on their respective display. By extension, visual communication is a method of providing not only the text data based on the user's intention but also video data. The video data is obtained by, for example, the user taking a picture of him/her and providing the video data to a display apparatus of the other party in real time. Therefore, the display apparatus of the other party can display both the video data and the text data. Thus, through the use of visual communication, a user can directly see another user during communication.

However, visual communication requires many resources. For example, visual communication requires a network resource such as a transmission bandwidth, and a system resource for, for example, processing the data because the video data obtained by taking images of users has to be transmitted and received between the display apparatuses. Accordingly, the quality of visual communication may deteriorate if support of a corresponding resource is not sufficient in accordance with usage environments.

SUMMARY

One or more exemplary embodiments provide a display apparatus and a control method thereof.

According to an aspect of an exemplary embodiment, there is provided a display apparatus including: a camera configured to photograph a first user of the display apparatus; a communication interface configured to communicate with an external apparatus of a second user; a display configured to display an image of a visual communication between the first user and the second user; and a controller configured to generate information regarding a change in a position of a face of the first user from an image of the first user photographed by the camera during the visual communication, and configured to transmit the information regarding the change in the position of the face of the first user to the external device so that the face of the first user having the changed position is displayed on the external apparatus.

The controller may be configured to provide a tag on at least one region forming a facial contour of the first user on the image of the first user, and may derive information regarding the change in the position of the face of the first user based on a changed value of the tag generated when at least one of a facial expression of the first user and a figure of the first user changes.

The controller may be configured to send setup information about the tag on the facial contour of the first user to the external apparatus at a beginning of the visual communication between the first user and the second user.

The setup information may include information about a relative position between a plurality of tags on the image of the first user and information on a ratio between the respective plurality of tags on the image of the first user.

The changed value of the tag may include a moving direction and a distance of the tag between a first frame and a second frame of the image of the first user.

The controller may be configured to control the display may display the image of the first, and may display a changed position of the first user based on the changed value of the tag.

The controller may configured to control the display may display an image of the second user, and may display a changed position of the second user based on a changed value of the tag corresponding to a facial contour of the second user on the image of the second user when the changed value of the tag corresponding to the facial contour of the second user is received from the external apparatus.

The communication interface may be configured to communicate with a server configured to provide at least one preset graphic image, and the controller may be configured to select and control the display to display the at least one graphic image provided by the server as the image of the second user image.

The controller may be configured to receive the image of the second user from the external apparatus and control the display to display the image of the second user.

The controller may be configured to adjust the image of the second user based on information about an angle of a facial posture of the second user received from the external apparatus.

The controller may be configured to perform at least one of lowering details of the image of the second user according to a number of external apparatuses communicating with the display apparatus and decreasing a number of tags processed with respect to the image of the second user if a number of external apparatuses participating in the visual communication exceeds a preset threshold value.

The communication interface may be configured to communicate with a server configured to provide at least one preset graphic image, and at least one of the image of the first user and the image of the second user may be selected from the preset graphic image provided by the server.

The display apparatus may further include a storage configured to store at least one preset graphic image, wherein at least one of the image of the first user and the image of the second user may be selected from the graphic images stored in the storage.

The controller may be configured to transmit the image of the first user to the external apparatus to display the image of the first user during the visual communication if the image of the first user is selected from the at least one preset graphic image stored in the storage.

The controller may be configured to control the display to display a user interface (UI) which allows a user to adjust at least one of a position and a ratio of tags within the image of the first user and details of the image of the first user, and may transmit the image of the first user adjusted through the UI to the external apparatus.

The controller may be configured to generate information about a position of a light source which is illuminated on the first user so that the image of the first user includes a shading effect.

A method of controlling a display apparatus, the method including: photographing a first user during visual communication between the display apparatus used by the first user and an external apparatus used by a second user; generating information regarding a change in a position of a face of the first user from a photographed image of the first user; and transmitting the information regarding the change in the position of the face of the first user to the external device so that the face of the first user having the changed position is displayed on the external apparatus.

The generating the information regarding the change in the position of the face of the first user may include: providing a tag on at least one region forming a facial contour of the first user on the image of the first user; and deriving the information regarding the change in the position of the face of the first user from a changed value of the tag generated when at least one of a facial expression of the first user and a figure of the first user changes.

The method may further include: sending setup information about the tag on the facial contour of the first user to the external apparatus at a beginning of the visual communication between the first user and the second user.

The setup information may include information about a relative position between a plurality of tags on the image of the first user and information on a ratio between the respective plurality of tags on the image of the first user.

The changed value of the tag may include a moving direction and a distance of the tag between a first frame and a second frame of the image of the first user.

The method may further include: displaying the image of the first user on the display apparatus; and adjusting a display state of the image of the first user displayed on the display apparatus based on the changed value of the tag.

The method may further include: displaying an image of the second user on the display apparatus; and adjusting a display state of the image of the second user based on a changed value of the tag corresponding to a facial contour of the second user on the image of the second user when the changed value of the tag corresponding to the facial contour of the second user is received from the external apparatus.

The displaying the image of the second user on the display apparatus may include receiving a graphic image from a server configured to provide at least one preset graphic image, and selecting and displaying the at least one preset graphic image as the image of the second user.

The displaying the image of the second user on the display apparatus may include receiving the image of the second user from the external apparatus and displaying the image of the second user.

The adjusting the display state of the image of the second user may include adjusting the image of the second user based on information about an angle of a facial posture of the second user received from the external apparatus.

The adjusting the display state of the image of the second user may include performing at least one of lowering details of the second user image of the second user according to a number of external apparatuses communicating with the display apparatus and decreasing a number of tags processed with respect to the image of the second user if a number of external apparatuses participating in the visual communication exceeds a preset threshold value.

At least one of the image of the first user and the image of the second user may be selected from at least one preset graphic image provided by a server.

At least one of the image of the first user and the image of the second user may be selected from at least one graphic image previously stored in the display apparatus.

The method may further include transmitting the image of the first user to the external apparatus in order to display the image of the first user during the visual communication if the image of the first user is selected from the at least one graphic image stored in the display apparatus.

The method may further include: displaying a user interface (UI) which allows a user to adjust at least one of a position and a ratio of tags within the image of the first user and details of the image of the first user; and transmitting the image of the first user adjusted through the UI to the external apparatus.

The method may further include: generating information about a position of a light source which is illuminated on the first user so that the image of the first user includes a shading effect.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following exemplary embodiments describe configurations directly related to the present inventive concept, and the descriptions of other configurations will be omitted. However, it will be understood that other configurations may be provided in realizing an apparatus or system to which the inventive concept is applied.

Figure 1:
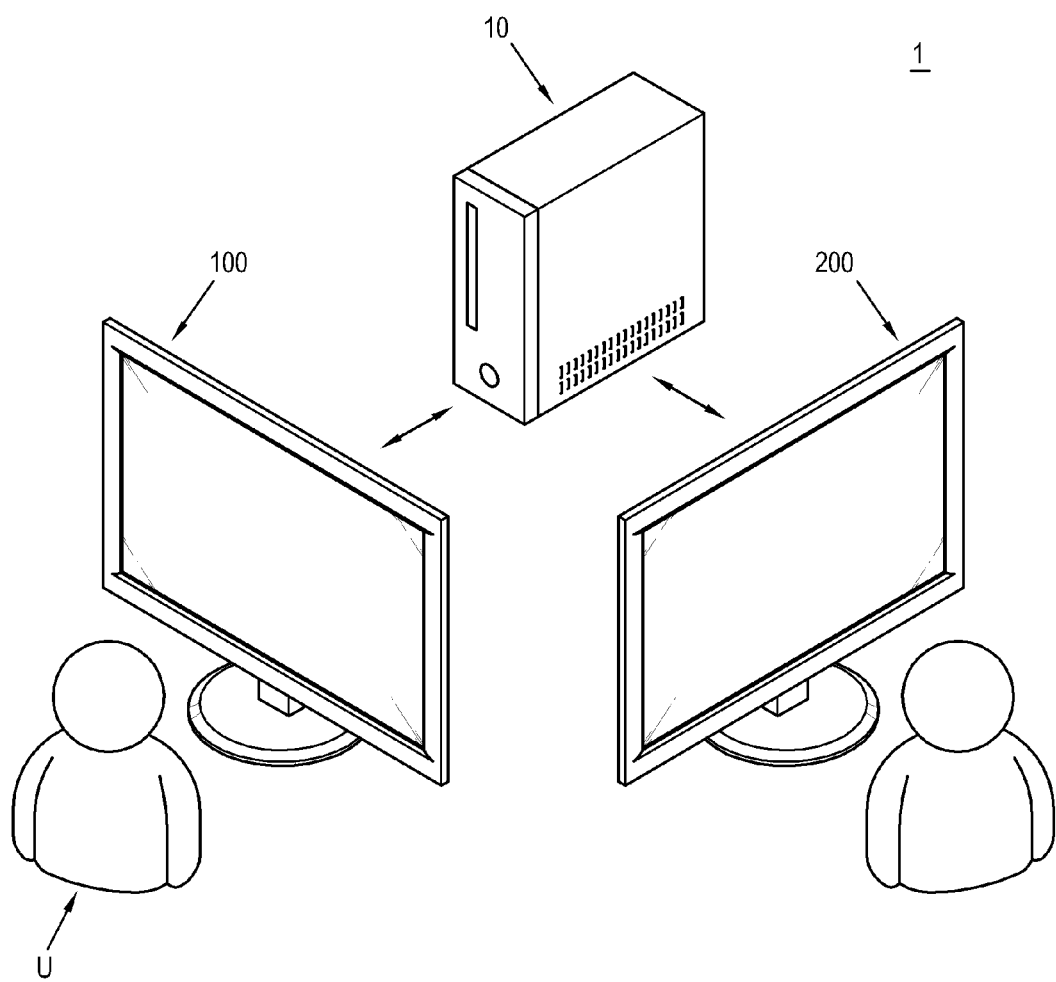
FIG. 1 is a view showing a system according to an exemplary embodiment.

FIG. 1 is a view showing a system 1 according to an exemplary embodiment.

As shown in FIG. 1, the system 1 in this exemplary embodiment includes an image transmitting apparatus 100 and an image receiving apparatus 200 which are clients connected to communicate with a server 10 through a network.

The system 1 provides visual communication between the image transmitting apparatus 100 and the image receiving apparatus 200.

In an environment where visual communication is performed, an apparatus which transmits data is called the image transmitting apparatus 100, and an apparatus which receives data is called the image receiving apparatus 200. The image transmitting apparatus 100 and the image receiving apparatus 200 may exchange their roles with each other during the visual communication.

Also, in this exemplary embodiment, the image transmitting apparatus 100 and the image receiving apparatus 200 are provided as a display apparatus, such as a TV, but are not limited thereto. Alternatively, the image transmitting apparatus 100 and the image receiving apparatus 200 may be achieved by various display apparatuses, for example, a computer set including a computer main body and a monitor locally connected thereto, a portable multimedia player, a tablet computer, a mobile phone, etc., as long as it can provide a user with the visual communication environment.

The following exemplary embodiments will describe the visual communication between one image transmitting apparatus 100 and one image receiving apparatus 200 within the system 1. However, this is just for the purpose of clearly describing the exemplary embodiments and the exemplary embodiments are not limited thereto. Alternatively, not only one to one visual communication but also one to n visual communication and n to n visual communication are possible within the system 1. That is, data transmitted from the image transmitting apparatus 100 may be received in and processed by a plurality of image receiving apparatuses 200, and one image receiving apparatus 200 may process data respectively received from a plurality of image transmitting apparatuses 100. However, one to n visual communication and n to n visual communication are achieved by applying and extending the present exemplary embodiments, and therefore detailed descriptions thereof will be omitted.

The visual communication performed in the system 1 is carried out via the server 10 between the image transmitting apparatus 100 and the image receiving apparatus 200 respectively connected to the server 10, but not limited thereto. Alternatively, the visual communication may be carried out in the state that the image transmitting apparatus 100 and the image receiving apparatus 200 are directly connected without the server 10.

During the visual communication between the image transmitting apparatus 100 and the image receiving apparatus 200, the data transmitted from the image transmitting apparatus 100 to the image receiving apparatus 200 may include two types of data, such as image data and voice data, such as a comment made by a user U. In this exemplary embodiment, the user U refers to a user who is using the image transmitting apparatus 100, unless otherwise specified. The visual communication can be performed, for example, when a user of the image transmitting apparatus 100 and a user of the image receiving apparatus 200 wish to discuss a program currently being broadcast.

The image data of the user U is generated by taking an image of the user U through a camera (not shown) of the image transmitting apparatus 100. In a video call, the image data of the user U includes a face image of the user U.

The voice data or comment data of the user U, which is for example, a word or sentence corresponding to a statement made by the user, may be generated by converting a voice signal, corresponding to a user voice which is input to the image transmitting apparatus 100, into text, or may be generated when a user directly inputs text to the image transmitting apparatus 100 through a character input device such as a keyboard (not shown).

The image receiving apparatus 200 processes and displays the image data and the voice data of the user U, received from the image transmitting apparatus 100. Also, the image receiving apparatus 200 and the image transmitting apparatus 100 can exchange the foregoing roles with each other when performing the visual communication between the image transmitting apparatus 100 and the image receiving apparatus 200.

Below, detailed configurations of the image transmitting apparatus 100 and the image receiving apparatus 200 will be described with reference to FIG. 2.

Figure 2:
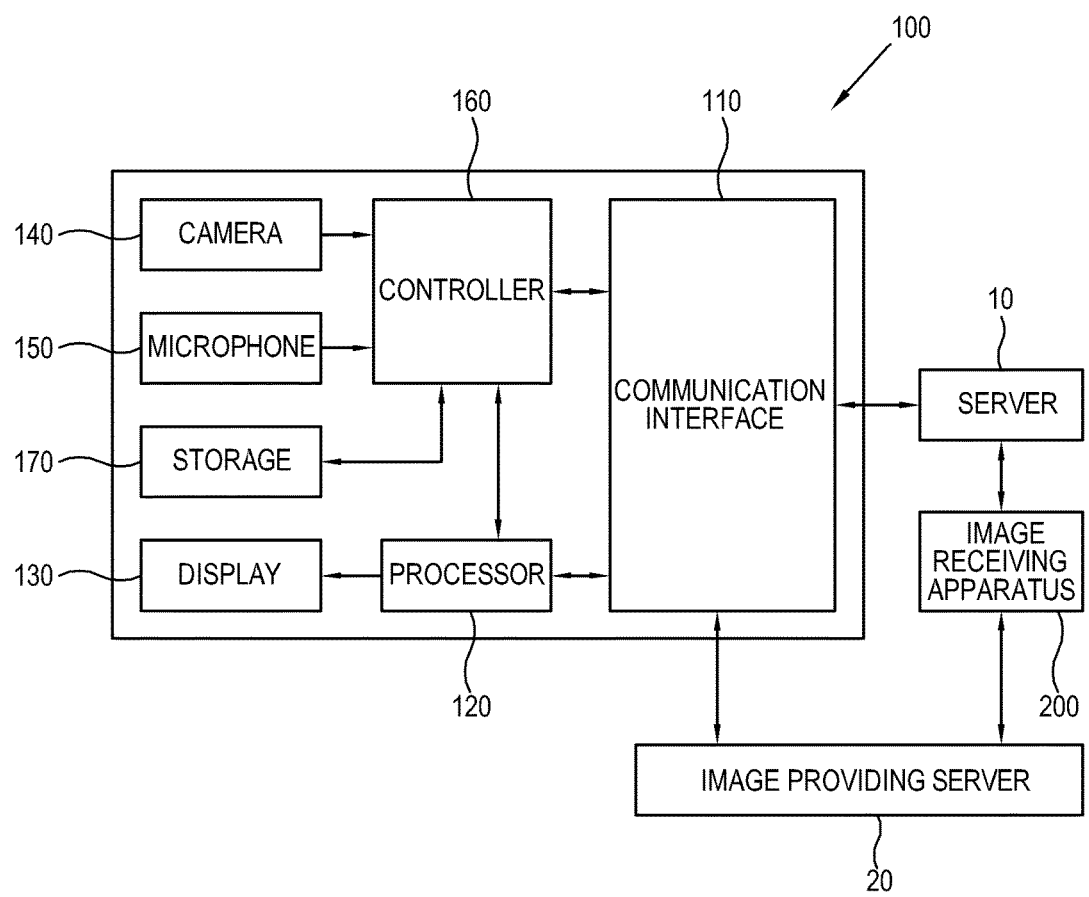
FIG. 2 is a block diagram of an image transmitting apparatus in the system of FIG. 1.

FIG. 2 is a block diagram of an image transmitting apparatus in the system of FIG. 1.

As shown in FIG. 2, the image transmitting apparatus 100 includes a communication interface 110 through which various signals, information, and/or data are transmitted to and received from other devices such as the server 10. The image transmitting apparatus 100 also includes a processor 120 which processes data received through the communication interface 110, a display 130 which displays an image based on data processed by the processor 120, a camera 140 which takes an image of an external environment of the image transmitting apparatus 100 and takes an image of a user, a microphone 150 which receives various sounds outside of the image transmitting apparatus 100 as well as receives a user's voice input, a storage 170 which stores data/information, and a controller 160 which controls general operations of the image transmitting apparatus 100.

Here, the server 10 refers to a communication server via which the image transmitting apparatus 100 and the image receiving apparatus 200 are connected to each other for the visual communication. If the image transmitting apparatus 100 and the image receiving apparatus 200 are directly connected, the visual communication does not need to be relayed via the server 10.

The communication interface 110 is connected to the server 10 or the image receiving apparatus 200 via the server 10 for interactive communication. The communication interface 110 may transmit data from the controller 160 to the image receiving apparatus 200, or data from the image receiving apparatus 200 to the controller 160. During visual communication between the image transmitting apparatus 100 and the image receiving apparatus 200, the communication interface 110 transmits data related to a user of the image transmitting apparatus 100 to the image receiving apparatus 200, or transmits data related to a user of the image receiving apparatus 200 and received from the image receiving apparatus 200 to the controller 160. In this operation, the server 10 may serve as a relay, or the communication interface 110 may be directly connected to the image receiving apparatus 200 in accordance with communication protocols.

The communication interface 110 may be connected to various external devices and peripheral devices besides the server 10 and the image receiving apparatus 200, and the connection may be achieved by a set of connection ports or connection modules in accordance with respective devices. Here, the communication interface 110 may be internally mounted to the image transmitting apparatus 100, or the entire communication interface 110 or a part of the communication interface 110 may be additionally installed in the image transmitting apparatus 100 in the form of an add-on or a dongle.

The communication interface 110 transmits and/or receives data in accordance with protocols designated corresponding to the respective connected devices, and thus transmits and/or receives the data based on individual connection protocols with regard to the respective connected devices. For example, the communication interface 110 transmits and/or receives a signal based on various standards such as a radio frequency (RF) signal, a composite or a component video, super video, Syndicat des Constructeurs d'Appareils Radiorécepteurs et Téléviseurs (WART), high definition multimedia interface (HDMI), a display port, a unified display interface (UDI), or wireless high-definition (wireless HD), etc.

The processor 120 applies various processes to the data and thus processes the data. The processor 120 transmits data, onto which such a process is reflected, to the communication interface 110, thereby transmitting the corresponding data to the image receiving apparatus 200.

There is no limit to the kind of processes that can be performed by the processor 120. For example, a process for video content data may include encoding, decoding, deinterlacing, frame refresh rate conversion, noise reduction for improving picture quality, detail enhancement, etc. Also, a process for voice data may include filtering, amplifying, volume control, etc. for a voice signal.

The processor 120 may be achieved by an individual chipset for independently performing each process, or by an image processing board mounted with a system-on-chip where various functions are integrated.

The display 130 displays an image based on video data output from the processor 120. The display 130 may be achieved by various display methods such as liquid crystal, plasma, a light-emitting diode, an organic light-emitting diode, a surface-conduction electron-emitter, a carbon nanotube, a nano-crystal, etc.

The display 130 may include additional elements in accordance with its display method. For example, if a liquid crystal display panel is used, the display 130 may include a backlight unit (not shown) for emitting light to the liquid crystal display panel (not shown), and a panel driving substrate (not shown) for driving the panel.

The camera 140 takes a moving image or a still image of an external environment of the image transmitting apparatus 100. The camera 140 takes images of various objects, such as a user, in a predetermined direction with respect to the image transmitting apparatus 100, for example, in front of the image transmitting apparatus 100. The camera 140 takes images of a user and generates moving image data containing frame unit images of the user and, transmits the generated data to the controller 160.

The storage 170 stores a variety of data under the control of the controller 160. The storage 170 is achieved by a flash memory, a hard disk drive, or the like. Specifically, the storage 170 is a non-volatile memory so as to preserve data regardless of whether system power is on or off. The storage 170 is accessed by the controller 160 so that previously stored data can be read, recorded, modified, deleted, updated, etc.

With this configuration, the controller 160 controls processing operations for various kinds of data received by the camera 140, the microphone 150, the communication interface 110, etc. For example, in the case of visual communication, the controller 160 controls the image data of a user received from the camera 140 and the voice or comment data corresponding to the user's voice transmitted from the microphone 150 to be transmitted to the image receiving apparatus 200. Also, when the image data and the voice data of the user of the image receiving apparatus 200 are received by the communication interface 110, the controller 160 controls the processor 120 to display such data on the display 130.

Here, the method of converting a user's voice input to the microphone 150 into a text can be performed in various ways. One example is to convert a voice signal from the microphone 150 into a text by the processor 120. Another example is to transmit a voice signal from the microphone 150 to a speech-to-text (STT) server (not shown) through the communication interface 110, and convert the corresponding voice signal into a text by the STT server (not shown).

Meanwhile, the image transmitting apparatus 100 and the image receiving apparatus 200 may communicate with not only the server 10 for relaying the communication but also an image providing server 20 for providing a preset graphic image, which will be described in detail later.

The image receiving apparatus 200 also includes elements equivalent to the foregoing elements of the image transmitting apparatus 100. The detailed configurations of the image receiving apparatus 200 are similar to those of the image transmitting apparatus 100, and thus repetitive descriptions thereof will be avoided.

Figure 3:
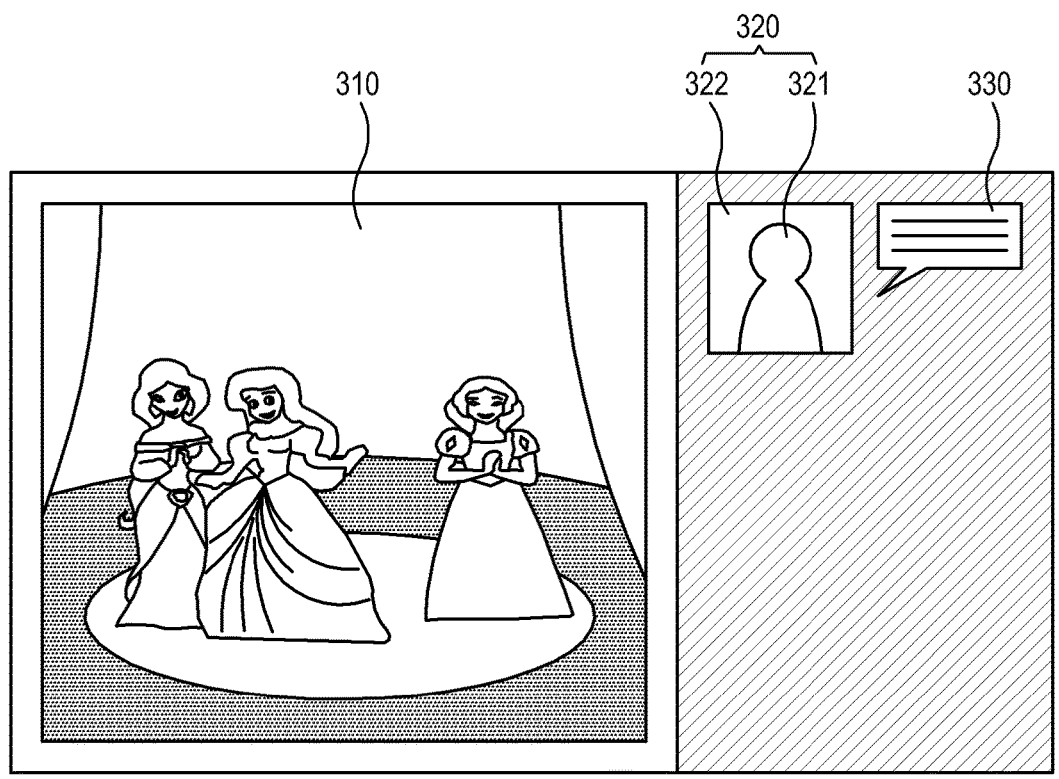
FIG. 3 is a view schematically showing a conventional case where a comment made by a user and an image of a user of an image transmitting apparatus are displayed in an image receiving apparatus.

FIG. 3 is a view schematically showing a conventional case where a comment made by a user and an image of a user of an image transmitting apparatus are displayed in an image receiving apparatus.

As shown in FIG. 3, in a conventional case of visual communication, the image transmitting apparatus 100 transmits the image data obtained by taking an image of a user and the voice data of the user to the image receiving apparatus 200 in real time.

Thus, the image receiving apparatus 200 displays a user image 320 and text 330 of a comment made by a user, received from the image transmitting apparatus 100, together with a predetermined content image 310. The predetermined content image 310 includes for example, a television program displayed on the image receiving apparatus 200. FIG. 3 shows that only the user image 320 and the text 330 of a user of the image transmitting apparatus 100 are displayed on the right side of the predetermined content image 310. Alternatively, an image and a text of a user of the image receiving apparatus 200 may be displayed in addition to those of the image transmitting apparatus 100.

The image transmitting apparatus 100 encodes the image data of a user through codec such as H.264 or the like, and transmits the encoded data to the image receiving apparatus 200. Further, the image receiving apparatus 200 decodes the encoded data received from the image transmitting apparatus 100.

In a conventional case, the image transmitting apparatus 100 transmits the image data of a user by a rectangular frame having a preset resolution of 640×480 or the like. Therefore, the user image 320 of a user displayed on the image receiving apparatus 200 includes the user's FIG. 321, including the user's head and body, and a background area 322 behind the user.

However, such a conventional method of the visual communication may have the following problems.

First, because the image data received from the image transmitting apparatus 100 is encoded by a certain codec, the image receiving apparatus 200 needs a decoding process in order to display the image data. However, if compressibility of the codec is high or if the image receiving apparatus 200 receives the image data from a plurality of image transmitting apparatuses 100, a required level for the system resource of the image receiving apparatus 200 becomes higher. If hardware and software specifications of the image receiving apparatus 200 do not satisfy such a required level, quality of a video call deteriorates.

Although the specifications of the image receiving apparatus 200 satisfies the required level, the image receiving apparatus 200 does not always perform only the video call for a predetermined time. The image receiving apparatus 200 basically supports multi-threading or multi-tasking so that it can for example display the content image 310 and the visual communication images (user image 320 and text 330) as shown in FIG. 3. In this case, the image receiving apparatus 200 has to perform both the process for displaying the content image 310 and the process for displaying the visual communication images (user image 320 and text 330), and therefore the specifications of the image receiving apparatus 200 may not satisfy the required level needed at a certain point of time in accordance with performance statuses of multi-threading and multi-tasking.

Second, more transmission bandwidth for data may be required in accordance with the amount of data during transmission of data from the image transmitting apparatus 100 to the image receiving apparatus 200. When more transmission bandwidth is needed, if a communication environment is bad between the image transmitting apparatus 100 and the image receiving apparatus 200, there is a negative influence on transmitting the data.

For example, if the image transmitting apparatus 100 transmits the image data encoded by the H.264 codec and has a resolution of 640×480 by 30 frames per second and 3 Kbytes per frame, in order to appropriately transmit the image data to the image receiving apparatus 200, a bandwidth of about 1.3 Mbps is needed. If the communication environments do not satisfy such conditions, there may occur a frame drop phenomenon where the image data is displayed without some frames in the image receiving apparatus 200.

Third, the user image 320 displayed on the image receiving apparatus 200 includes not only a user's face, but also the background area 322 behind the user. Therefore, the present environment in which the user of the image transmitting apparatus 100 is situated is shown to the user of the image receiving apparatus 200, which may cause a privacy problem. Also, the user image 320 may contain an upper half of a user's body. Therefore, if the user is not wearing clothes, the user's figure is shown to the user of the image receiving apparatus 200.

Taking such problems into account, the following methods are provided according to exemplary embodiments.

Figure 4:
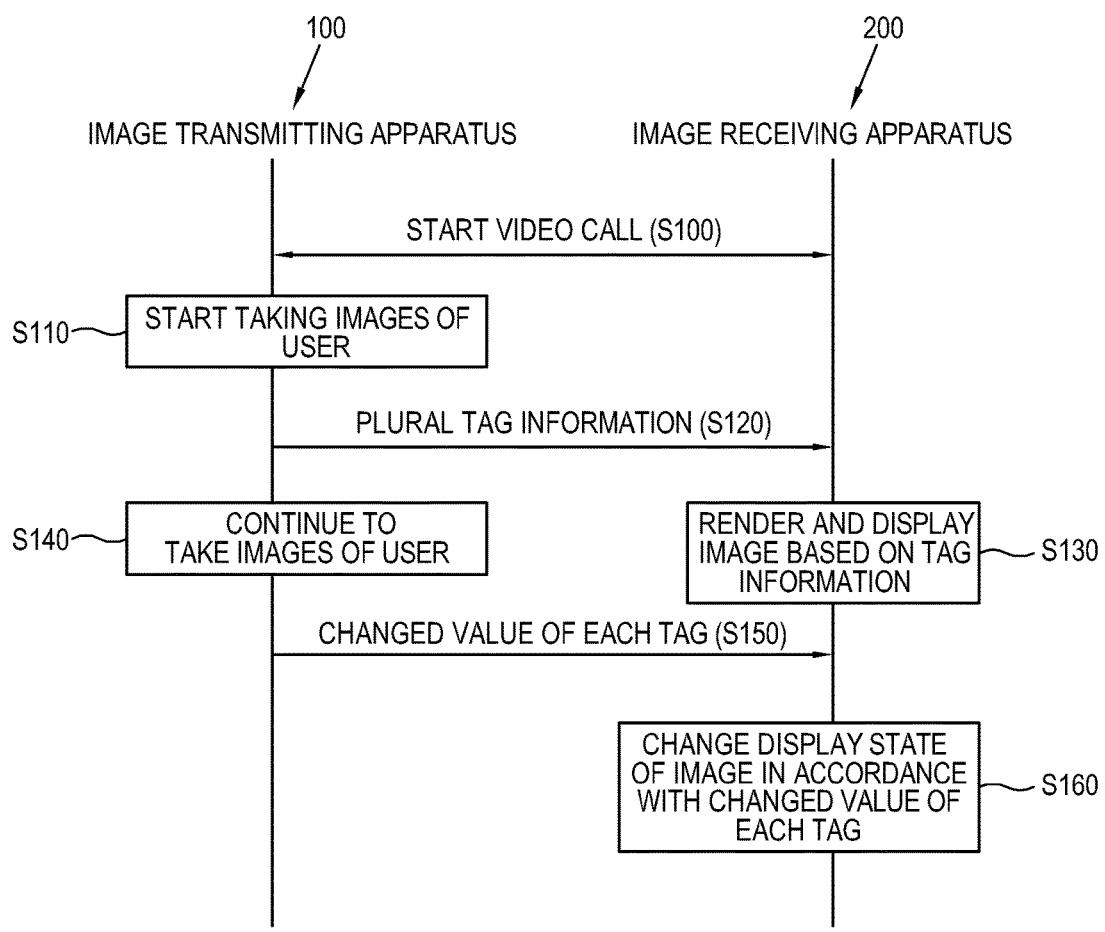
FIG. 4 is a view showing signal transmission between the image transmitting apparatus and the image receiving apparatus in the system of FIG. 1.

FIG. 4 is a view showing signal transmission between the image transmitting apparatus and the image receiving apparatus in the system of FIG. 1.

As shown in FIG. 4, at a point of time when visual communication with the image receiving apparatus 200 begins (S100), the image transmitting apparatus 100 starts sensing a user's face, that is, taking an image of the user's face (S110). The image transmitting apparatus 100 transmits a plurality of tag setup information respectively corresponding to a plurality of positions set up along a contour of the user's face to the image receiving apparatus 200 (S120).

The image receiving apparatus 200 displays an image showing a face of a user of the image transmitting apparatus 100 (S130).

Here, the image showing a face of a user of the image transmitting apparatus 100, which is displayed on the image receiving apparatus 200, may be provided in various methods as follows.

In accordance with one method, the image transmitting apparatus 100 transmits a graphic image, corresponding to a user, to the image receiving apparatus 200, and the image receiving apparatus 200 displays the received graphic image as an image showing a face of a user of the image transmitting apparatus 100 during the visual communication. The graphic image may be selected from images previously stored in the storage 170 (refer to FIG. 2) of the image transmitting apparatus 100, or may be received from the image providing server 20 (refer to FIG. 2).

The image transmitting apparatus 100 may select one graphic image in accordance with a user's selection, or may automatically select one graphic image in accordance with various previously designated conditions.

The graphic image stored in the storage 170 or in the image providing server 20 may have various patterns as an image showing a human's facial shape and is not limited to a particular pattern.

In accordance with another method, the image receiving apparatus 200 does not have to receive the graphic image corresponding to a user of the image transmitting apparatus 100 from the image transmitting apparatus 100, but may use the graphic image which it stored at the beginning of the visual communication, or the image receiving apparatus 200 may receive it from the image providing server 20.

In accordance with another method, the image receiving apparatus 200 may generate a user's image based on the plurality of tag setup information received from the image transmitting apparatus 100. The plurality of tag setup information received at operation S120 includes information about relative positions between respective tags and information about ratios between the respective tags, as information for making the plurality of tags correspond to respective positions of a facial contour of a user of the image transmitting apparatus 100. Thus, the image receiving apparatus 200 may create and show a user's schematic figure based on the foregoing setup information.

Further, while the image of the user of the image transmitting apparatus 100 is displayed on the image receiving apparatus 200 and the visual communication is performed, the image transmitting apparatus 100 continuously takes images of a user (S140). Also, the image transmitting apparatus 100 transmits a changed value of each tag, corresponding to a change in the position of a user's face, to the image receiving apparatus 200 in real time (S150).

Thus, the image receiving apparatus 200 changes a display state of the previously displayed rendered image in accordance with the changed value of each tag received from the image transmitting apparatus 100 (S160). For example, the image receiving apparatus 200 may adjust the corresponding tag position on the rendered image in accordance with the changed values of the tag.

The changed value of each tag includes information about a moving direction and moving distance of each tag by a frame value.

Therefore, it is possible to reduce the transmission bandwidth consumed in transmitting the image data of a user from the image transmitting apparatus 100 to the image receiving apparatus 200. Also, the image receiving apparatus 200 only adjusts each tag position on the image in accordance with the changed value of the tag information during the visual communication after initially displaying the image, thereby reducing the system resources as compared with the conventional frame decoding method. Also, the image receiving apparatus 200 displays the user without the user's background, thereby providing the user with privacy.

Below, a method of giving information of tags 410 of a user's image in the image transmitting apparatus 100 will be described with reference to FIG. 5.

Figure 5:
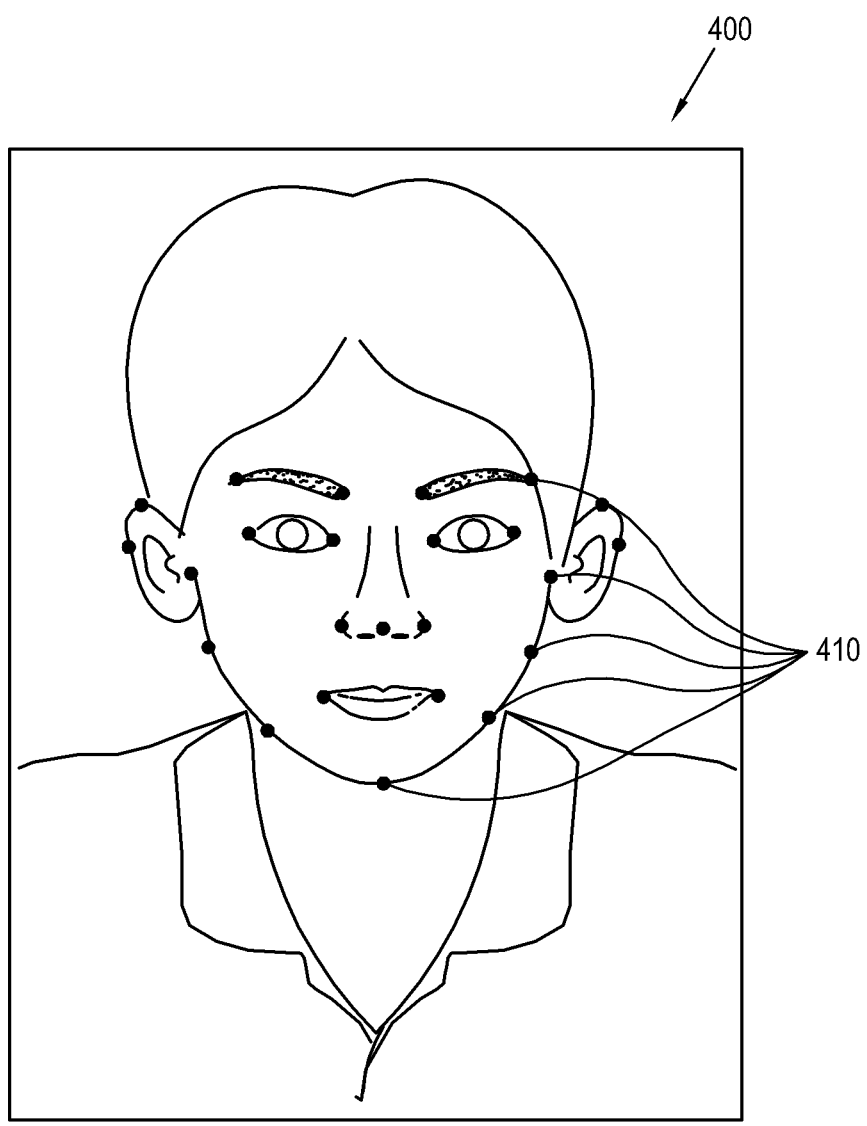
FIG. 5 is a view showing an exemplary embodiment of providing tags onto an image of a user sensed by the image transmitting apparatus of FIG. 1.

FIG. 5 is a view showing an exemplary embodiment of providing tags 410 on an image of a user sensed in the image transmitting apparatus 100.

As shown in FIG. 5, the image transmitting apparatus 100 determines a user's face on an image 400 if the image 400 containing the user's face is taken.

The image transmitting apparatus 100 determines a contour constituting a face within the image of the user's face. The user's face shown in FIG. 5 includes eyes, eyebrows, a nose, lips, ears, a face profile, etc. Thus, the contour constituting the face refers to the contours of such elements. For example, the contour is the outline or shape representing the eyes, eyebrows, a nose, lips, ears, a face profile, etc.

The image transmitting apparatus 100 designates tags 410 for the plurality of preset positions on the contours constituting the face. That is, a tag 410 is a kind of flag indicating a certain position or region on the contour of a user's face.

Here, it will be appreciated that FIG. 5 shows a plurality of tags 410 at predetermined positions on the contour as points, and shows only the points less than those provided in a real apparatus. The positions where the tags 410 are designated on the contour may be determined by various methods. For example, the tags 410 may be positioned at opposite ends of an eye, the pupil of the eye, the tip of a nose, the ridge of the nose, nostrils, left and right ends of the lips, the philtrum, an upper end of an ear, an earlobe end, a face profile, etc.

Also, this exemplary embodiment shows that the tags 410 are points on the contour, but are not limited thereto. Alternatively, the tag 410 may be in a region where a predetermined number of pixels are included.

In a general case of one's face, the number of tags 410 is determined within a range from, for example, 60 to 80. The number of tags is a numerical range which can schematically achieve the contour of a user's face and change in a facial expression.

Here, as the respective tags 410 are designated on the image 400, a distance, a direction and the like relationship between the respective tags 410 are determined. Since the tags 410 are designated on the contour of a user's face, it is possible to determine relative positions about the facial contour, a ratio of a certain part in the face, and relationships between the certain parts of the face when the relationship between the tags 410 is determined. That is, it is possible to determine a user's face in accordance with the distance, direction and the like relationship between the tags 410.

Here, the number of tags 410 may be determined as a default value designated in the image transmitting apparatus 100, or may be adjusted by a user in the image transmitting apparatus 100. If the number of tags 410 increases, a user's facial expression or position change can be shown in more detail, but the amount of information to be processed and transmitted is increased. On the other hand, if the number of tags 410 decreases, the amount of information to be processed and transmitted is decreased, but it is more disadvantageous in showing a user's facial expression or change in position in detail.

The image transmitting apparatus 100 transmits data about the image 400 of the user together with the plurality of information about the tags 411) to the image receiving apparatus 200. The image receiving apparatus 200 renders a new image in accordance with the received image 400 and the tag 410.

Here, the image 400 used by the image transmitting apparatus 100, on which the tags 410 are provided, is an image corresponding to one frame taken by the camera 140, and the rendered image rendered by the image receiving apparatus 200 based on the information about the tag 410 is a vector image based on computer graphic (CG).

The user image displayed on the image receiving apparatus 200 may be rendered in the image receiving apparatus 200, or rendered in the image transmitting apparatus 100 and then provided to the image receiving apparatus 200.

Also, the image transmitting apparatus 100 may transmit a computer graphic (CG) image separately provided from the server 10 or the like to the image receiving apparatus 200 and not the image 400 of one frame which was taken by the image transmitting apparatus 100. The image receiving apparatus 200 displays the CG image received from the image transmitting apparatus 100, and processes information about the respective tags 410 which is matched with a face of the corresponding CG image.

Also, the image receiving apparatus 200 may receive only the information about the tags 410 from the image transmitting apparatus 100, and directly receive the CG image from the server 10.

Meanwhile, when the user image is transmitted by the image transmitting apparatus 100 to the image receiving apparatus 200, the image transmitting apparatus 100 may provide the image to a user so that the rendered image can be adjusted by the user.

Figure 6:
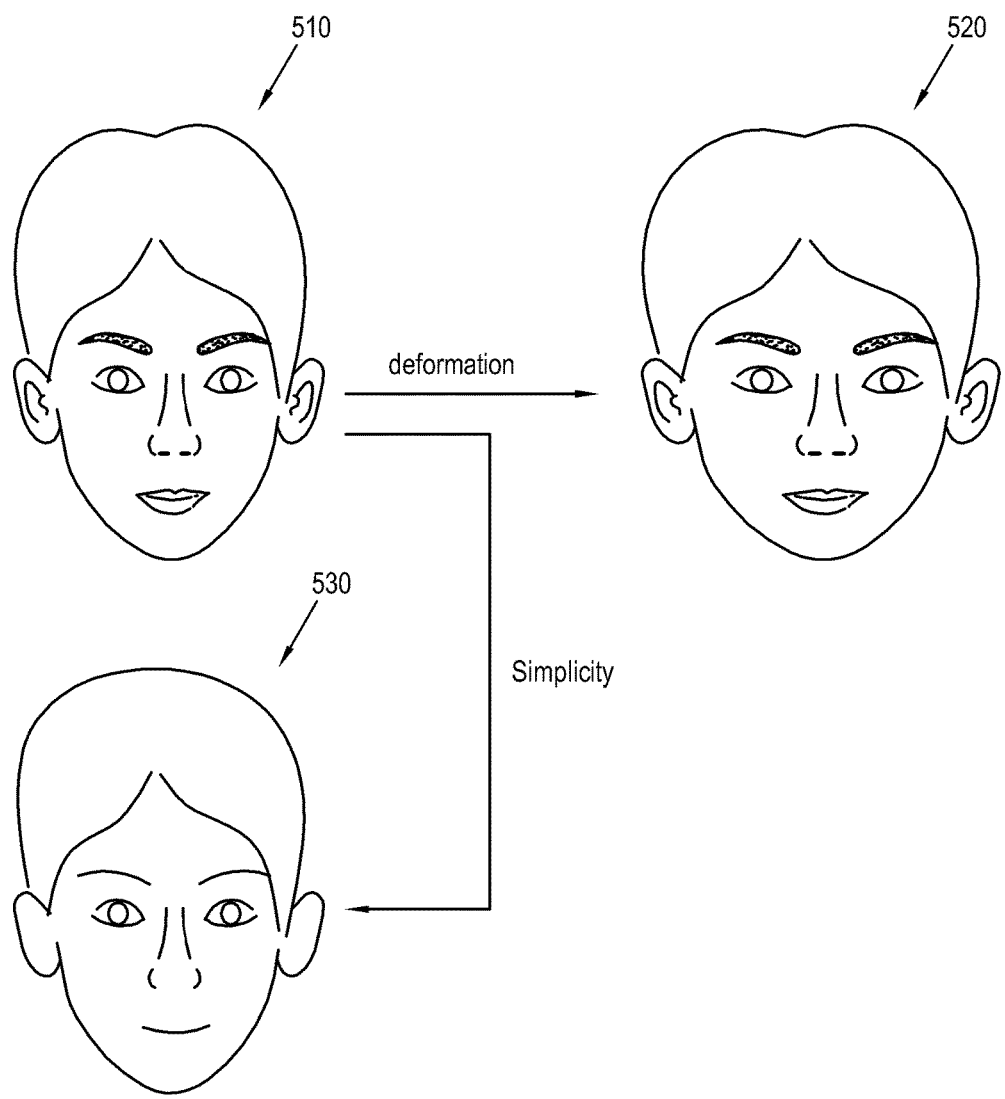
FIG. 6 is a view showing a result from adjusting an image in the image transmitting apparatus of FIG. 1.

FIG. 6 is a view showing a result from adjusting an image in the image transmitting apparatus of FIG. 1.

As shown in FIG. 6, a method where a user can adjust the image 510 includes two methods which are "deformation" and "simplicity".

Deformation is a method of adjusting a distance between the tags or a ratio of the tags while maintaining the detail of the image 510 and the number of tags. An image 520 is a result of increasing a horizontal ratio by a predetermined numerical value while maintaining a vertical ratio.

Simplicity is a method of lowering the detail of the image 510 and reducing the number of tags. An image 530 is formed by simplifying the contours of the eyes, nose and lips in the image 510. As a result, the image 530 needs fewer tags than the image 510.

The image transmitting apparatus 100 may display a user interface (UI) image which allows a user to select a plurality of sets of images 520 and images 530 obtained by applying the deformation method or the simplicity method to the image 510.

Also, the foregoing configurations may be applied to the image receiving apparatus 200. That is, when the image 510 is generated, the image receiving apparatus 200 may provide a user of the image receiving apparatus 200 with an environment for adjusting the image 510.

With respect to the amount of detail on an image, the image receiving apparatus 200 may allow a user to designate the number of tags received from the image transmitting apparatus 100 or may automatically adjust the number of tags in accordance with a preset condition. For example, the image transmitting apparatus 100 designates the number of tags.

In the case of automatic adjustment conditions, the image receiving apparatus 200 has to process more data as the number of image transmitting apparatuses 100 participating in the visual communication increases. Also, the image receiving apparatus 200 may have insufficient system resources for processing data related to the visual communication in accordance with the current processed status of the corresponding system.

Thus, the image receiving apparatus 200 may perform at least one of decreasing the number of tags processed with respect to each user image and lowering the detail of the user images respectively corresponding to the image transmitting apparatuses 100 if the number of image transmitting apparatuses 100 participating in the visual communication exceeds a preset threshold value.

Also, the image receiving apparatus 200 may decrease the number of tags for a processing an object within the user image from each image transmitting apparatus 100 and may lower the detail of the displayed image if the controller (not shown), the processor (not shown) or the like currently requires too much of the system resources of the image receiving apparatus 200.

Of course, the image receiving apparatus 200 may restore the number of tags for processing the object and the detail of the image if it is determined that the number of image transmitting apparatuses 100 participating in the visual communication becomes fewer than the threshold value or that the system resources are sufficiently secured.

Below, a changed value of tag 611, transmitted from the image transmitting apparatus 100 to the image receiving apparatus 200 during visual communication, will be described.

Figure 7:
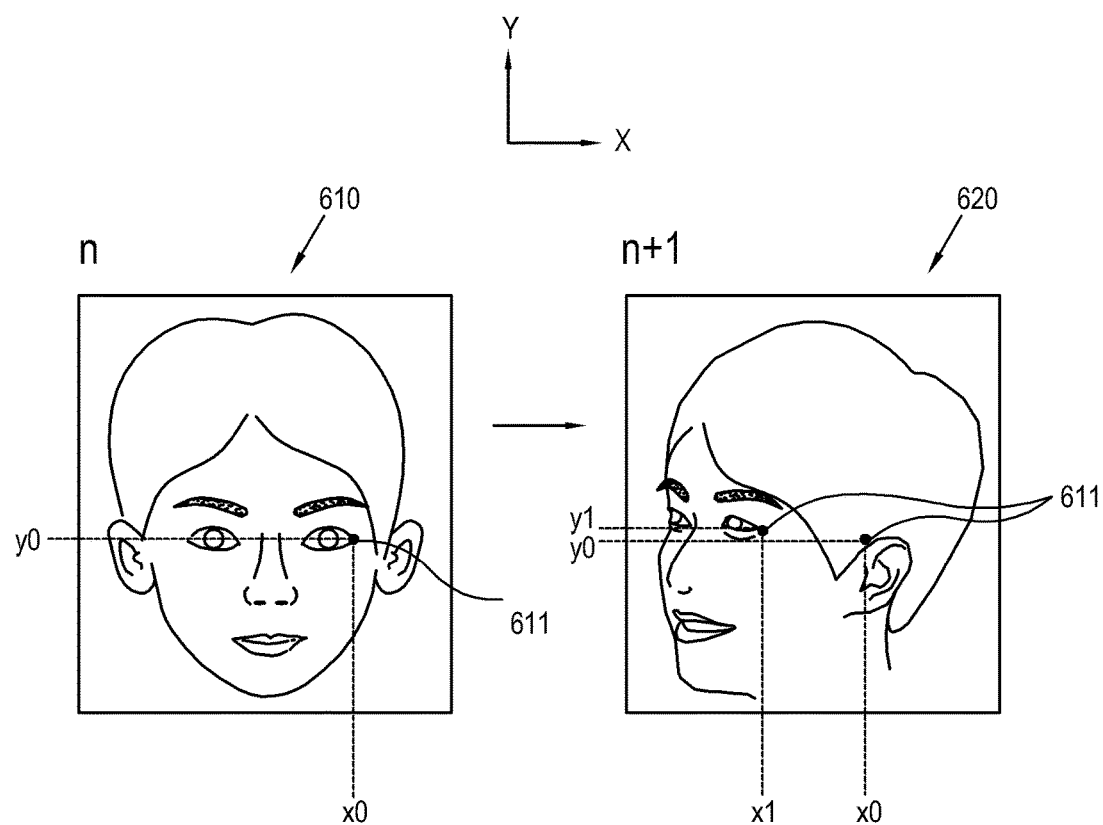
FIG. 7 is a view showing a change in a specified tag between the nth frame and the (n+1)th frame in an image taken of a user in the image transmitting apparatus of FIG. 1.

FIG. 7 is a view showing a change in a specified tag between the nth frame 610 and the (n+1)th frame 620 in an image taken of a user in the image transmitting apparatus 100. FIG. 7 illustrates only one tag 611, but in practice the same principle is applied to all the tags 611 within the image.

As shown in FIG. 7, the image transmitting apparatus 100 continuously takes images of a user and deduces a change in a position of each tag 611 by a frame as the visual communication is performed while the rendered image of the user of the image transmitting apparatus 100 is displayed in the image receiving apparatus 200.

In the example shown in FIG. 7, the tag 611 has coordinates of (x0, y0) on a 2-dimensional (2D) X-Y plane at the nth frame 610 when the tag 611 is designated at an outer end of a user's left eye, In this case, if a user moves, the position of the tag 611 is also changed. At the (n+1)th frame 620, the coordinates of the tag 611 are changed from (x0, y0) to (x1, y1).

As the coordinates of the tag 611 are changed from (x0, y0) to (x1, y1), it is possible to calculate the moving direction and moving distance of the tag 611, i.e., the changed value of the tag 611 during the change from the nth frame 610 to the (n+1)th frame 620. In other words, if there are two coordinates of starting and ending points on the 2D X-Y plane, it is possible to mathematically calculate a vector value.

Here, the moving direction may be represented by various methods. For example, the moving direction may be represented by a vector, or may be represented by a predetermined angle within 360 degrees with respect to the coordinates (x0, y0) of the starting point.

Also, the moving distance may be represented by various methods. For example, the moving distance may be represented by a number of pixels or other units of length.

The image transmitting apparatus 100 transmits such a calculated changed value of the tag 611 to the image receiving apparatus 200 frame by frame or on a preset cycle.

The image receiving apparatus 200 adjusts a display state of the previously displayed image, based on the changed value of the tag 611 received from the image transmitting apparatus 100. That is, the image receiving apparatus 200 adjusts the position of the corresponding tag 611 within the rendered image in accordance with the received changed value, thereby representing a user's facial expression or position change.

Here, a degree of adjusting the position of the tag 611 within the image by the image receiving apparatus 200 corresponds the changed value of the tag 611 received from the image transmitting apparatus 100. However, the degree does not need to be numerically equal to the changed value. For example, the image receiving apparatus 200 may offset a gain of the moving direction or distance to an original value and apply it to the adjustment instead of reflecting the same value as the received changed value of the tag 611 on the adjustment of the image. Here, various modifications are possible to the adjustment in accordance with rendering methods of the image receiving apparatus 200.

As described above, the image transmitting apparatus 100 in this exemplary embodiment does not transmit all of the taken image frames of a user but only the changed value of the tag 611, thereby representing a user's facial expression and position change in real time with less data than that of a conventional case.

Meanwhile, the image transmitting apparatus 100 may transmit additional information besides the changed value of the tag to the image receiving apparatus 200 in accordance with various designs and reflect the additional information on the image.

Figure 8:
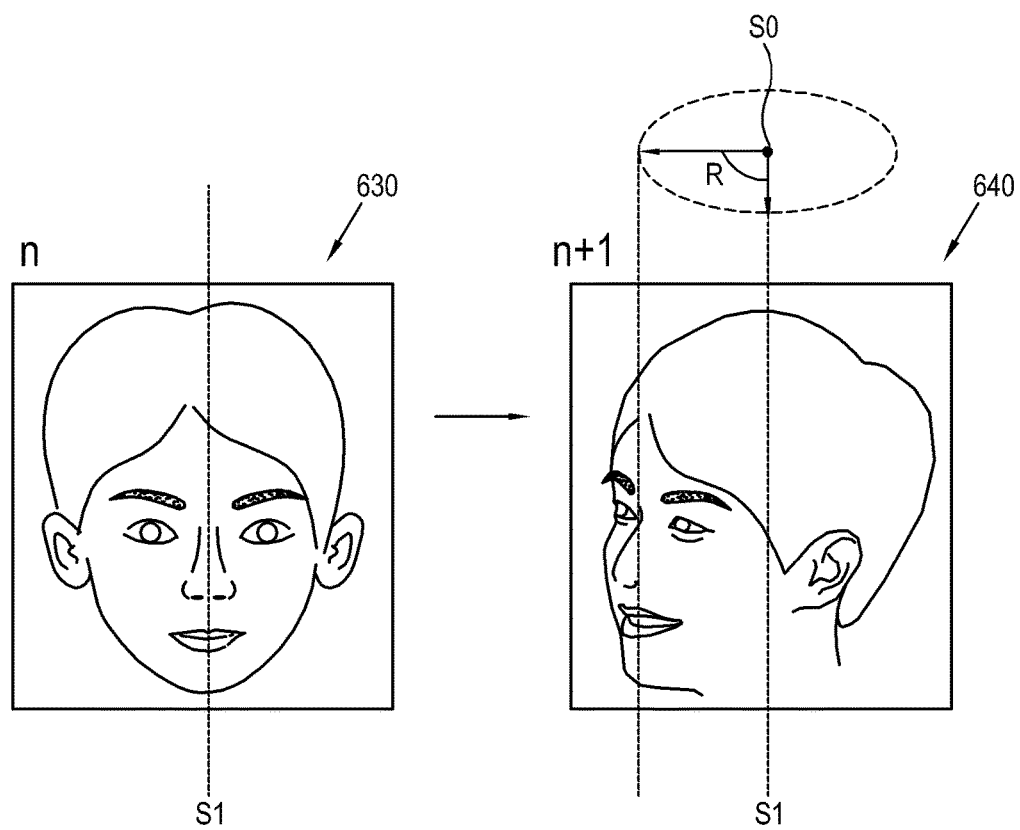
FIG. 8 is a view showing a change in a user's posture between the nth frame and the (n+1)th frame in an image taken of a user in the image transmitting apparatus of FIG. 1.

FIG. 8 is a view showing a change in a user's posture between the nth frame 630 and the (n+1)th frame 640.

As shown in FIG. 8, a user turns his/her head to one side. In this case, the nth frame 630 shows that a user looks straight ahead, and the (n+1)th frame 640 shows that a user turns his/her head to one side.

If an axis line S1 is set up along a user's nose, the axis line S1 is turned with respect to a predetermined center S0 as the user turns his/her head to one side. Here, the change from the nth frame 630 to the (n+1)th frame 640 causes the axis line S1 to rotate at an angle R with respect to the center S0.

The image transmitting apparatus 100 analyzes the nth frame 630 and the (n+1)th frame 640 to calculate the angle R, and the image receiving apparatus 200 adjusts the image based on the angle R received from the image transmitting apparatus 100.

Also, the image transmitting apparatus 100 deduces information indicating a position of a light source within an image taken of a user, and transmits the information about the position of the light source to the image receiving apparatus 200. The image receiving apparatus 200 may apply a shading process to the image in accordance with the received information about the position of the light source.

For example, if the light source is positioned at the right side of a user, his/her face is gradually shaded as going far away from the brightest right upside position. The image receiving apparatus 200 applies a gradation process to the image, thereby reflecting such a shading effect on the image.

Figure 9:
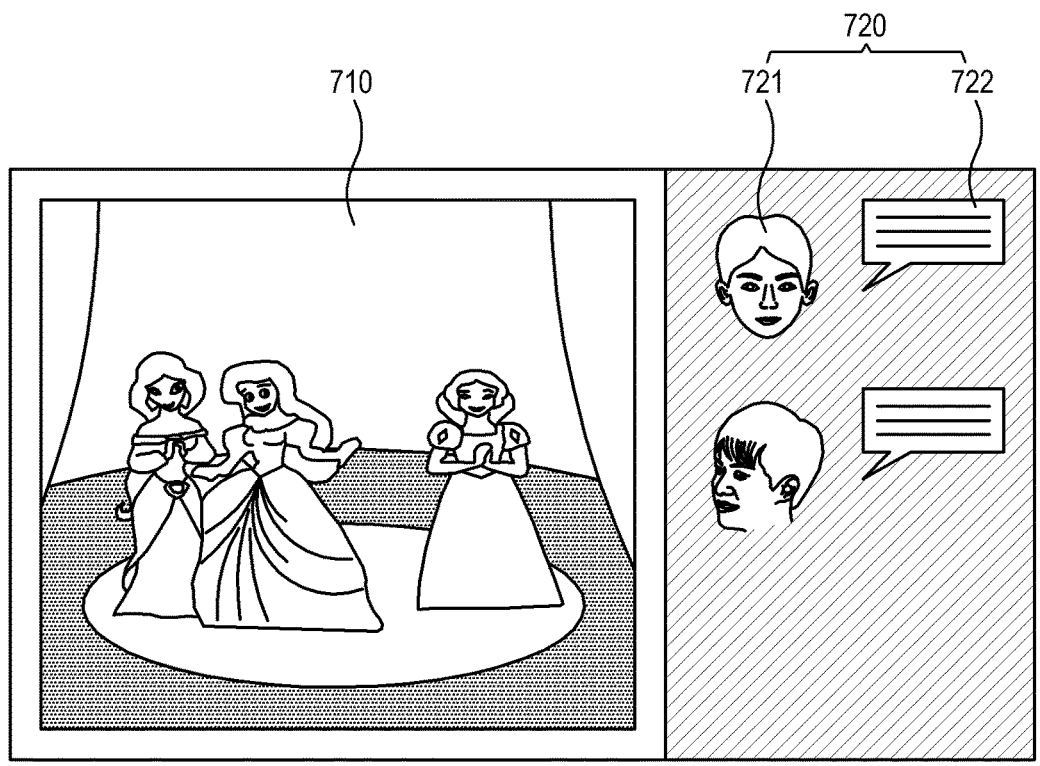
FIG. 9 is a view schematically showing a visual communication image displayed on the image receiving apparatus of FIG. 1.

FIG. 9 is a view schematically showing a visual communication image displayed on the image receiving apparatus 200.

As shown in FIG. 9, the image receiving apparatus 200 displays a visual communication image 720 together with a predetermined content image 710 in accordance with the foregoing exemplary embodiments. The visual communication image 720 includes the image 721 of the user of the image transmitting apparatus 100 and the text of the comment 722.

The image receiving apparatus 200 may freely designate the size, the arrangement and the like of the image 721 while displaying the image 721, in accordance with design methods. The image receiving apparatus 200 displays the images 721 of users of one or more image transmitting apparatuses 100 participating in the visual communication, and may additionally display the image of a user of the image receiving apparatus 200.

FIG. 9 illustrates that the content image 710 and the visual communication image 720 are displayed without being overlapped with each other, but are not limited thereto. For example, the image 721 or the comment 722 may be displayed as being at least partially overlaid on the content image 710.

Figure 10:
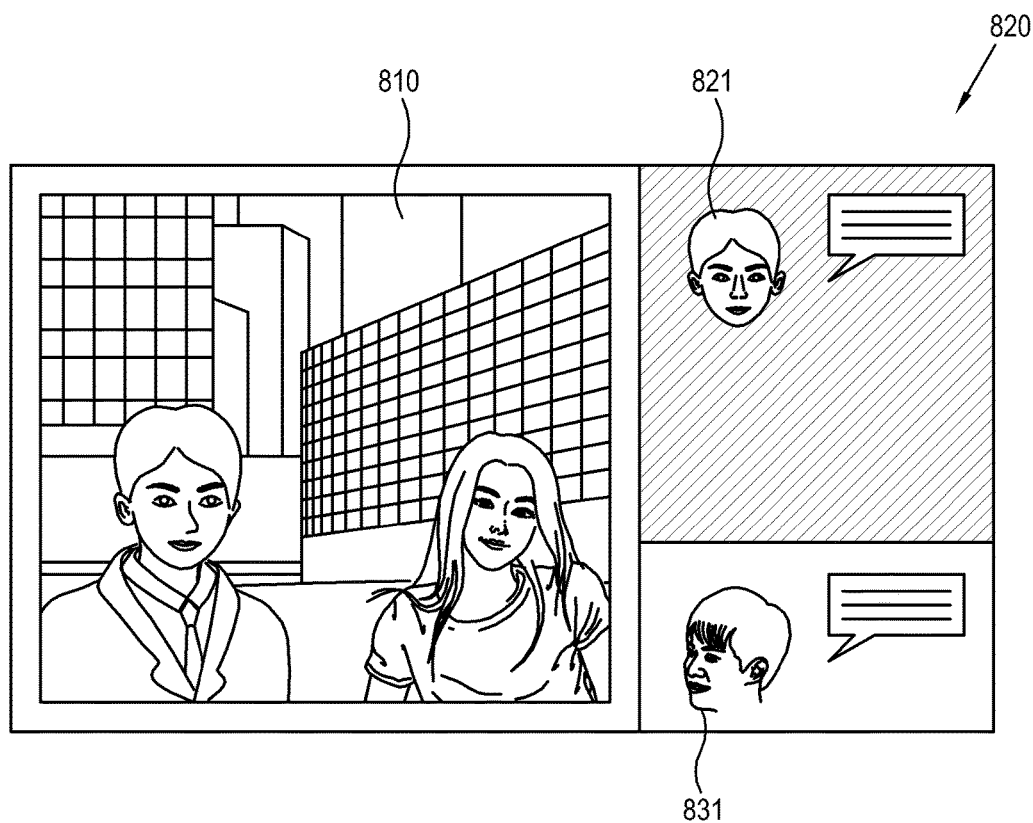
FIG. 10 is a view schematically showing a visual communication image displayed on the image transmitting apparatus of FIG. 1.

FIG. 10 is a view schematically showing a visual communication image displayed on the image transmitting apparatus 100.

As shown in FIG. 10, the image transmitting apparatus 100 displays a visual communication image 820 together with a predetermined content image 810. For convenience of explanation, a user of the image transmitting apparatus 100 will be called a first user, and a user of the image receiving apparatus 200 will be called a second user. The visual communication image 820 contains a first user image 831 showing the first user together with a second user image 821 showing the second user. That is, the first user image 831 may be displayed on the image transmitting apparatus 100 as well as on the image receiving apparatus 200 during the visual communication.

The image transmitting apparatus 100 transmits a changed position value of a tag to the image receiving apparatus 200 so as to adjust the display state of the first user image 831 displayed on the image receiving apparatus 200. At this time, the image transmitting apparatus 100 also adjusts the display state of the first user image 831 displayed thereon, based on the changed position value of the tag.

Thus, when the first user image 831 is displayed on each of the image transmitting apparatus 100 and the image receiving apparatus 200, the figure of the first user image 831 on each of the image transmitting apparatus 100 and the image receiving apparatus 200 is changed according to a change in the first user's facial expression or position.

Figure 11:
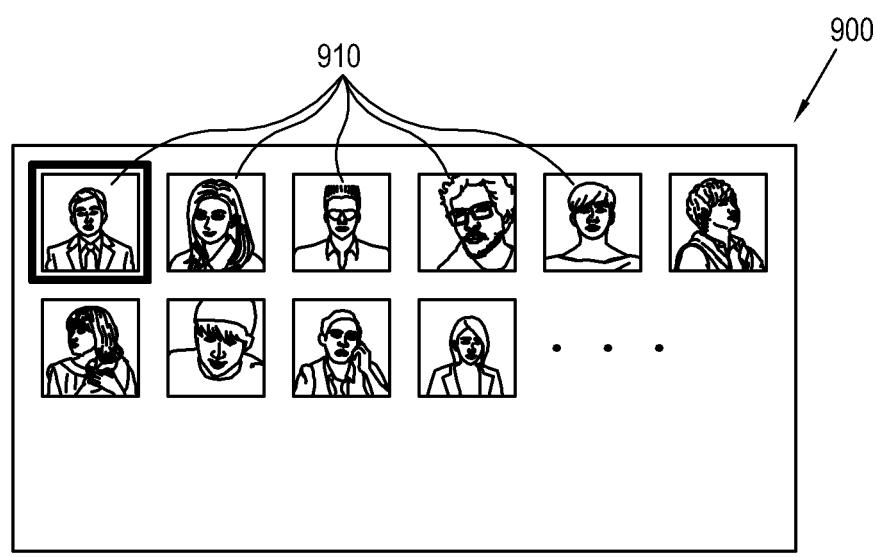
FIG. 11 is a view showing a user interface (UI) image for selecting an image provided by the image providing server of FIG. 2.

FIG. 11 is a view showing a user interface (UI) image 900 for selecting an image 910 provided by the image providing server 20.

As shown in FIG. 11, the image transmitting apparatus 100 or the image receiving apparatus 200 may access the image providing server 20 (refer to FIG. 2) and receive various images 910, which will be used as an image of a user during the visual communication, from the image providing server 20. The image providing server 20 provides an UI image 900 for selecting the image 910 corresponding to a user's facial shape. The users of the image transmitting apparatus 100 or the image receiving apparatus 200 select the images 910 through the UI image 900, and use the selected images 910 as an image corresponding to the user of the image transmitting apparatus 100 and an image corresponding to the user of the image receiving apparatus 200.

The image transmitting apparatus 100 may select the image 910 from the image providing server 20 at the beginning of the visual communication and transmit the selected image 910 to the image receiving apparatus 200, or may previously select and store the image 910 from the image providing server 20 and then transmit it to the image receiving apparatus 200 at the beginning of the visual communication. Alternatively, the image transmitting apparatus 100 may require the image receiving apparatus 200 select the image from the image providing server 20.

As described above, the image transmitting apparatus 100 according to an exemplary embodiment generates changed information corresponding to change in a user's face based on a user's image photographed by the camera 140 during the visual communication, and transmits the changed information to the image receiving apparatus 200 so that a user's face can be changed in a user image showing the user when the user image is displayed on the image receiving apparatus 200. The image transmitting apparatus 100 in this exemplary embodiment transmits information about a plurality of tags which respectively correspond to a plurality of positions along the contours of a user's face to the image receiving apparatus 200. The image transmitting apparatus 100 transmits information about the plurality of tags at the beginning of the visual communication. Thus, the image receiving apparatus 200 displays the rendered image based on the received information related to the plurality of tags.

Further, the image transmitting apparatus 100 transmits the changed value of each tag corresponding to a change in a user's face to the image receiving apparatus 200 during the visual communication while the rendered image is displayed on the image receiving apparatus 200. Thus, the image receiving apparatus 200 adjusts the display state of the rendered image based on the received changed value of each tag.

In the foregoing exemplary embodiment, the image transmitting apparatus 100 and the image receiving apparatus 200 use the server 10 to perform the visual communication.

However, the relay of the server 10 is not always necessary for the visual communication among at least two display apparatuses.

Figure 12:
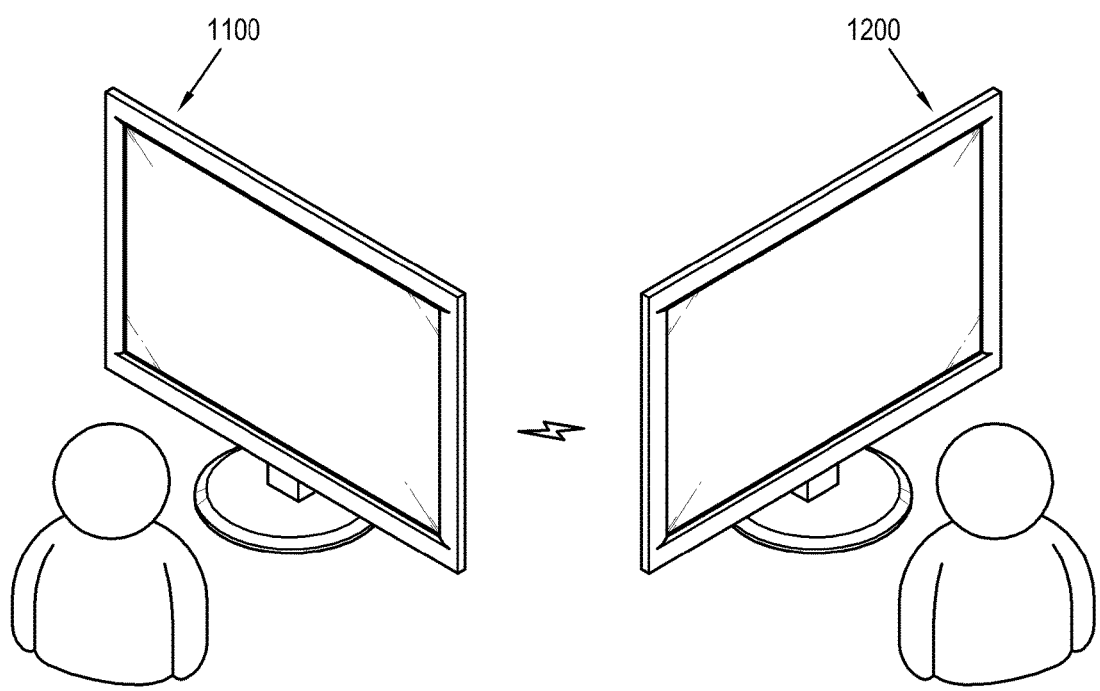
FIG. 12 is a view showing a system according to a second exemplary embodiment.

FIG. 12 is a view showing a system according to a second exemplary embodiment.

As shown in FIG. 2, this system includes an image transmitting apparatus 1100 and an image receiving apparatus 1200 which perform visual communication. In the exemplary embodiment, the image transmitting apparatus 1100 and the image receiving apparatus 1200 are respectively achieved by display apparatuses, and a user of the image transmitting apparatus 1100 can perform visual communication using an image from the image receiving apparatus 1200.

Here, the image transmitting apparatus 1100 and the image receiving apparatus 1200 can perform the visual communication while they are directly connected to each other. In this case, the image transmitting apparatus 1100 and the image receiving apparatus 1200 can exchange data without using any kind of relay. Such a communication method may employ any peer-to-peer type protocol, such as Wi-Fi Direct, but is not limited thereto.

Figure 13:
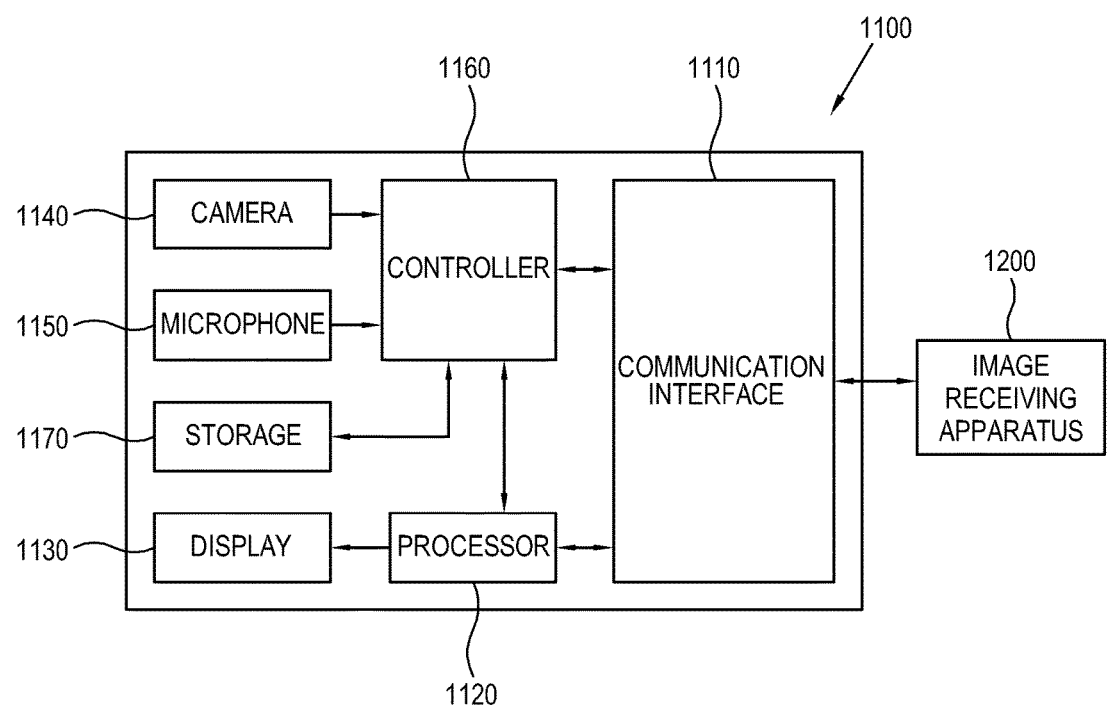
FIG. 13 is a block diagram of an image transmitting apparatus in the system of FIG. 12.

FIG. 13 is a block diagram of the image transmitting apparatus 1100 in the system of FIG. 12.

As shown in FIG. 13, the image transmitting apparatus 1100 includes a communication interface 1110, a processor 1120, a display 1130, a camera 1140, a microphone 1150, a controller 1160, and a storage 1170. These elements perform substantially the same operations as those of the first exemplary embodiment shown in FIG. 2, and thus repetitive descriptions thereof will be avoided. Also, the image receiving apparatus 1200 is the same display apparatus as the image transmitting apparatus 1100, and therefore the elements of the image transmitting apparatus 1100 can be applied to the image receiving apparatus 1200.

The communication interface 1110 may be connected to the image receiving apparatus 1200 via a separate relay such as the server 10 (refer to FIG. 1) like that of the first exemplary embodiment, but may be connected directly to the image receiving apparatus 1200 in accordance with communication protocols.

The operations of the image transmitting apparatus 1100 and the image receiving apparatus 1200 are similar to those of the first exemplary embodiment, therefore repetitive descriptions will be omitted.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A display apparatus comprising:
   a camera configured to photograph a first user of the display apparatus;
   a communication interface configured to communicate with an external apparatus of a second user;
   a display configured to display an image of a visual communication between the first user and the second user; and
   a controller configured to generate information regarding a change in a facial appearance of the first user from images of the first user photographed by the camera during the visual communication, and transmit the information to the external device so that the external apparatus displays a face of the first user without receiving the images of the first user from the display apparatus.

2. The display apparatus according to claim 1, wherein the controller is configured to provide a tag on at least one region forming a facial contour of the first user on the image of the first user, and derive the information based on a changed value of the tag generated when at least one of a facial expression of the first user and a figure of the first user changes.

3. The display apparatus according to claim 2, wherein the controller is configured to send setup information about the tag on the facial contour of the first user to the external apparatus at a beginning of the visual communication between the first user and the second user.

4. The display apparatus according to claim 3, wherein the setup information comprises information about a relative position between a plurality of tags on the image of the first user and information on a ratio between the respective plurality of tags on the image of the first user.

5. The display apparatus according to claim 2, wherein the changed value of the tag comprises a moving direction and a distance of the tag between a first frame and a second frame of the image of the first user.

6. The display apparatus according to claim 2, wherein the controller is configured to control the display to display the image of the first user, and displays a changed facial appearance of the first user based on the changed value of the tag.

7. The display apparatus according to claim 2, wherein the controller is configured to control the display to display images of the second user, and displays a changed facial appearance of the second user based on a changed value of a tag corresponding to a facial contour of the second user on the images of the second user when the changed value of the tag corresponding to the facial contour of the second user is received from the external apparatus.

8. The display apparatus according to claim 7, wherein the communication interface is configured to communicate with a server configured to provide at least one preset graphic image, and
   wherein the controller is configured to select and control the display to display the at least one preset graphic image provided by the server as the image of the second user.

9. The display apparatus according to claim 7, wherein the controller is configured to receive the image of the second user from the external apparatus and control the display to display the image of the second user.

10. The display apparatus according to claim 7, wherein the controller is configured to adjust the image of the second user based on information about an angle of a facial posture of the second user received from the external apparatus.

11. The display apparatus according to claim 7, wherein the controller is configured to perform at least one of lowering details of the image of the second user according to a number of external apparatuses communicating with the display apparatus and decreasing a number of tags processed with respect to the image of the second user if a number of external apparatuses participating in the visual communication exceeds a preset threshold value.

12. The display apparatus according to claim 7, wherein the communication interface is configured to communicate with a server configured to provide at least one preset graphic image, and wherein at least one of the image of the first user and the image of the second user is selected from the preset graphic image provided by the server.

13. The display apparatus according to claim 7, further comprising a storage configured to store at least one preset graphic image,
wherein at least one of the image of the first user and the image of the second user is selected from the at least one preset graphic image stored in the storage.

14. The display apparatus according to claim 13, wherein the controller is configured to transmit the image of the first user to the external apparatus to display the image of the first user during the visual communication if the image of the first user is selected from the at least one preset graphic image stored in the storage.

15. The display apparatus according to claim 2, wherein the controller is configured to control the display displays a user interface (UI) which allows a user to adjust at least one of a position and a ratio of tags within the image of the first user, and details of the image of the first user, and transmit the image of the first user adjusted through the UI to the external apparatus.

16. The display apparatus according to claim 2, wherein the controller is configured to generate information about a position of a light source which is illuminated on the first user so that the image of the first user includes a shading effect.

17. A method of controlling a display apparatus, the method comprising:
photographing a first user during visual communication between the display apparatus used by the first user and an external apparatus used by a second user;
generating information regarding a change in a facial appearance of the first user from photographed images of the first user; and
transmitting the information to the external device so that the external apparatus displays a face of the first user without receiving the images of the first user from the display apparatus.

18. The method according to claim 17, wherein the generating the information comprises:
providing a tag on at least one region forming a facial contour of the first user on the image of the first user; and
deriving the information from a changed value of the tag generated when at least one of a facial expression of the first user and a figure of the first user changes.

19. The method according to claim 18, further comprising sending setup information about the tag on the facial contour of the first user to the external apparatus at a beginning of the visual communication between the first user and the second user.

20. The method according to claim 19, wherein the setup information comprises information about a relative position between a plurality of tags on the image of the first user and information on a ratio between the respective plurality of tags on the image of the first user.

21. The method according to claim 18, wherein the changed value of the tag comprises a moving direction and a distance of the tag between a first frame and a second frame of the image of the first user.

22. The method according to claim 18, further comprising:
displaying the image of the first user on the display apparatus; and
adjusting a display state of the image of the first user displayed on the display apparatus based on the changed value of the tag.

23. The method according to claim 18, further comprising:
displaying an image of a second user on the display apparatus; and
adjusting a display state of the image of the second user based on a changed value of the tag corresponding to a facial contour of the second user on the image of the second user when the changed value of the tag corresponding to the facial contour of the second user is received from the external apparatus.

24. The method according to claim 23, wherein the displaying the image of the second user on the display apparatus comprises receiving a graphic image from a server configured to provide at least one preset graphic image, and selecting and displaying the at least one preset graphic image as the image of the second user.

25. The method according to claim 23, wherein the displaying the image of the second user on the display apparatus comprises receiving the image of the second user from the external apparatus and displaying the image of the second user.

26. The method according to claim 23, wherein the adjusting the display state of the image of the second user comprises adjusting the image of the second user based on information about an angle of a facial posture of the second user received from the external apparatus.

27. The method according to claim 23, wherein the adjusting the display state of the image of the second user comprises performing at least one of lowering details of the image of the second user according to a number of external apparatuses communicating with the display apparatus and decreasing a number of tags processed with respect to the image of the second user if a number of external apparatuses participating in the visual communication exceeds a preset threshold value.

28. The method according to claim 23, wherein at least one of the image of the first user and the image of the second user is selected from at least one preset graphic image provided by a server.

29. The method according to claim 23, wherein at least one of the image of the first user image and the image of the second user is selected from at least one graphic image previously stored in the display apparatus.

30. The method according to claim 29, further comprising transmitting the image of the first user to the external apparatus in order to display the image of the first user during the visual communication if the image of the first user is selected from the at least one graphic image stored in the display apparatus.

31. The method according to claim 18, further comprising:
displaying a user interface (UI) which allows a user to adjust at least one of a position and a ratio of tags within the image of the first user and details of the image of the first user; and
transmitting the image of the first user adjusted through the UI to the external apparatus.

32. The method according to claim 18, further comprising: generating information about a position of a light source which is illuminated on the first user so that the image of the first user includes a shading effect.

* * * * *